United States Patent [19]
Ekstrom

[11] 3,992,659
[45] Nov. 16, 1976

[54] HIGH VOLTAGE DIRECT CURRENT TRANSMISSION

[75] Inventor: Ake Ekstrom, Ludvika, Sweden

[73] Assignee: Allmanna Svenska Elektriska Aktiebolaget, Vasteras, Sweden

[22] Filed: July 3, 1975

[21] Appl. No.: 593,049

[30] Foreign Application Priority Data
July 19, 1974 Sweden .............................. 7409437

[52] U.S. Cl. .................................... 321/2; 321/19
[51] Int. Cl.² .......................................... H02M 5/45
[58] Field of Search ................... 321/2, 19, 45 S, 11, 321/14

[56] References Cited
UNITED STATES PATENTS

| | | | |
|---|---|---|---|
| 3,354,384 | 11/1967 | Benjamin | 321/19 X |
| 3,453,526 | 7/1969 | Bowles | 321/19 |
| 3,467,848 | 9/1969 | Ainsworth | 321/14 |
| 3,648,147 | 3/1972 | Leete | 321/45 S X |
| 3,883,790 | 5/1973 | Hammarlund et al. | 321/14 X |
| 3,883,791 | 5/1975 | Zelina et al. | 321/19 X |
| 3,896,287 | 7/1975 | Cook | 321/19 X |
| 3,912,980 | 10/1975 | Crump et al. | 321/19 X |

Primary Examiner—William M. Shoop
Attorney, Agent, or Firm—Watson, Cole, Grindle & Watson

[57] ABSTRACT

A high voltage direct current transmission includes a rectifier station and an inverter station each connected to an AC network and connected together by a DC line. In order to limit over-voltages on the line and in the rectifier station on starting the station towards an open line, this station is provided with an arrangement which senses the voltage and the current of the station and is connected by level indicators for maximum voltage and minimum current to a signal emitter which reduces the direct voltage of the station in response to a direct voltage above a certain level and a direct current below a certain level.

3 Claims, 4 Drawing Figures

HIGH VOLTAGE DIRECT CURRENT TRANSMISSION

BACKGROUND OF THE INVENTION

1. Field of the Invention

The present invention relates to a high voltage direct current transmission which comprises a rectifier station and an inverter station each connected to an AC network and connected together by a DC line.

2. The Prior Art

More particularly, the invention relates to devices for limiting overvoltages when starting the transmission, either in the case of a new start or in the case of reconnection after temporary interruptions, for example because of the release of fault protection devices. Particularly, in the latter case it is often desirable to have a quick reconnection and start of the transmission, and it is therefore of interest to achieve a rapid start control of the transmission. Such a rapid start control, however, involves a problem since it may lead to dangerous overvoltages on the line and in the rectifier station when starting the station towards a so-called "open" line.

An open line is the same as an interrupted line, which may be due to faults in the line itself, but more often it is due to faults in the inverter station, so that the inverter station does not take up any current. Since no current flows, the current control of the rectifier station will reduce the control angle for the valves of the station to a minimum, and thus the direct voltage of the station to a maximum, and as a further consequence of no or very low direct current a so-called top rectification will occur, that is, by charging of all capacitances of the transmission the direct voltage will correspond to the amplitude value of the alternating voltage without causing the voltage smoothing which arises when a current flows. To this is to be added the voltage reflection on the line, which is an inevitable consequence of the open line. This is particularly dangerous in the case of cable transmissions, which are very sensitive to overvoltages, so that this phenomenon places heavy demands on the discharge protection of the line.

SUMMARY OF THE INVENTION

According to the invention, the risk of dangerous overvoltages is avoided by timely sensing of the combination of an increased voltage and a low current so that the required measures can be taken in the form of a reduction of the direct voltage of the rectifier station. This is done by providing means for sensing the voltage and current of the station, these means being connected by level indicators for maximum voltage and minimum current to a signal emitter which emits a signal to reduce the direct voltage of the station in response to a direct voltage above a certain level and a direct current below a certain level.

BRIEF DESCRIPTION OF THE DRAWINGS

In other respects the invention will be described in more detail with reference to the accompanying drawing, in which.

DESCRIPTION OF THE PREFERRED EMBODIMENTS

Figure 1:
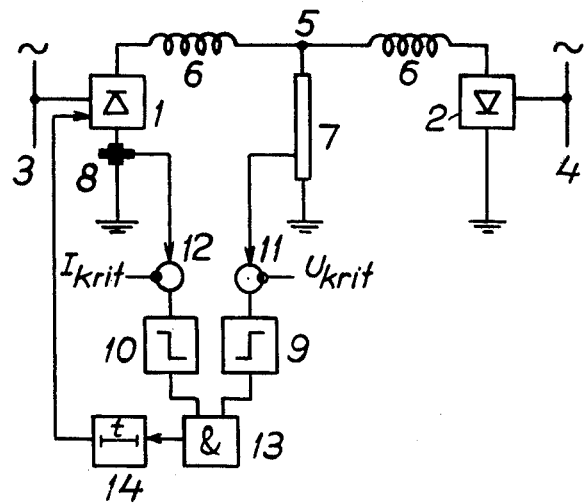
FIG. 1 shows a DC transmission with a device according to the invention.

FIG. 1 shows a DC transmission comprising a rectifier and an inverter station 1 and 2, respectively, each connected to an AC network 3 and 4, respectively, and connected together by means of a DC line 5 with smoothing reactors 6. Each station may consist of one or more series-connected and/or parallel-connected static convertors. The stations are provided with normal control members (not shown) for current and voltage and, as mentioned, when starting the rectifier station, an open, that is, an interrupted and non-conducting line will cause this station to increase its direct voltage to the maximum value.

To prevent the overvoltages caused by the above phenomena, the rectifier station is provided with a voltage divider 7 and a measuring transductor 8 or similar devices for measuring direct voltage and direct current. The measurement values are fed to level indicators or discriminators 9 and 10, respectively, which are provided on their input sides with summation members 11 and 12, respectively, to which said measurement values are fed, as well as the critical values for the maximum allowed voltage $U_{krit}$ and minimum current $I_{krit}$, respectively. If the line voltage exceeds the value $U_{krit}$ at the same time that the direct current is lower than the value $I_{krit}$, it is probably an indication of the fact that the rectifier is working towards an open line, and the And gate 13 which receives a double input signal will deliver an output signal which is connected to the control system of the rectifier system for reduction of the direct voltage of the station in any conventional manner. This reduction in voltage is performed most rapidly by influencing the angular control of the station in such a way that the control angle for the valves of the station is increased, the direct voltage thus decreasing. Another possibility is to block the rectifiers, and a third possibility is to shunt one or more rectifiers in the station.

To prevent transient signals from 13, which are not due to an open line, from causing an unjustified voltage reduction, a time delay device 14 may be arranged at the output side of 13.

In the arrangement according to FIG. 1 it must be taken into consideration that it will take a certain time before the transmission 5 has been charged to the critical voltage $U_{krit}$, during which time the charging current exceeds the value $I_{krit}$. It must therefore be taken into account that the line voltage may reach considerable values before the member 14 delivers a signal to produce voltage reduction.

In order to have information at an early stage as to the line being open, for example because of a fault in the inverter, the current and the voltage should be sensed in the inverter and these values should be returned to the rectifier station. However, such a transmission of measurement values can be avoided by compensating for the line reactance during the voltage and current measurement in the rectifier station, thus being informed about the line voltage and the line current in the inverter station at an early stage.

Figure 2:
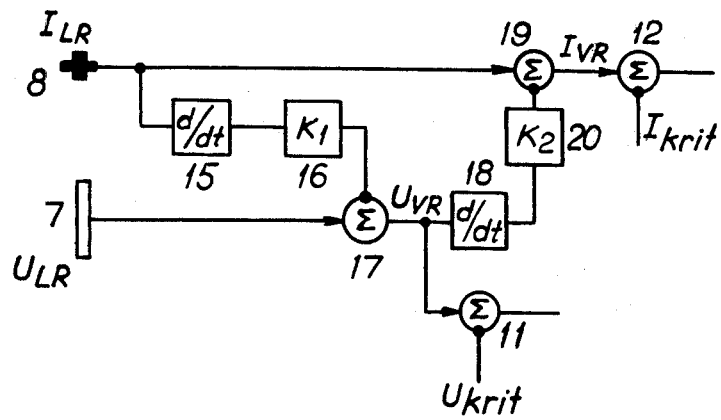
FIG. 2 shows a compensating device for the line reactance.

Such a compensation can be carried out with a device according to FIG. 2, said device being connected between, on the one hand, the measuring members 7 and 8 and, on the other hand, between the summation members 11 and 12 in FIG. 1.

Starting from the rectifier voltage $U_{LR}$, the rectifier current $I_{LR}$ and an equivalent line inductance L, the voltage in the inverter, $U_{VR}$, may be expressed as $$U_{VR} = U_{LR} - L \cdot \frac{dI_{LR}}{dt}$$

where the latter term indicates the inductive line voltage drop.

In FIG. 2, the voltage divider 7 is connected to one input of a summator 17. To the other input of 17 there is connected the transductor 8 by way of a derivator 15 and an amplifier 16, which gives the last term in the above equation. The output from 17 is connected to the input 11 of the level indicator 9, as well as to a second derivator 18.

Current in the inverter, $I_{VR}$, can be expressed in a similar way, namely, $$I_{VR} = I_{LR} - C \cdot \frac{dU_{VR}}{dt}$$

C being the line capacitance. The last term thus denotes the charging current of the line.

To the summator 19 there are fed, on the one hand, the rectifier current value, $I_{LR}$, from the transductor 8, and on the other hand the voltage value, $U_{VR}$, which gives the last term in the second equation. The output from 19 is connected to the input 12 of the level indicator 10.

In consequence of the above, it will be the calculated voltage and current of the inverter that will influence the signal circuit 9 – 14 according to the invention.

In a device according to FIGS. 1 and 2 there will be a risk of temporary overvoltages causing an unjustified release in the case of a low load current. To prevent this, the critical voltage level at 11 should possibly be chosen to be unreasonably high, with a resultant delayed release signal from 14.

The above drawback can be prevented with a device according to FIG. 3, in which a voltage reduction is achieved in the inverter station at currents below a certain level $I_{min}$, which is done by increasing the margin of commutating of the inverter station at a low current.

Figure 3:
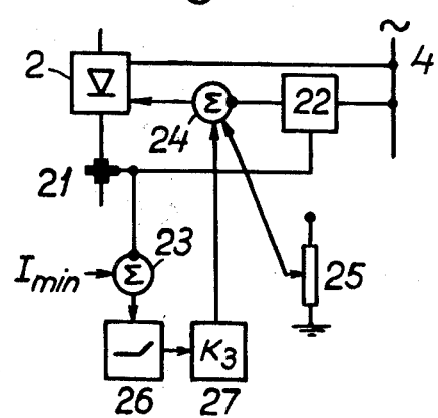
FIG. 3 shows a device for control of the inverter by a current-dependent margin of commutating.

The inverter station in FIG. 3 is provided with a commutating margin control device 22 which my be designed, for example, according to U.S. Pat. No. 3,536,985 and which is connected to the AC network 4 and to a DC meter 21. A desired value emitter 25 for the commutating margin is connected by way of the summator 24. To this there is also connected a current-dependent addition to the desired value from 25. This addition is taken out, for example, as the difference between the current value from 21 and a minimum value $I_{min}$ for current, which difference is calculated in the summator 23 and fed to a limiter 26, which delivers an increasing signal when the load current falls below $I_{min}$. This signal is supplied to 24 through the amplifier 27 as an addition to the desired value from 25.

Figure 4:
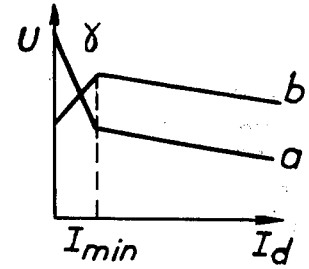
FIG. 4 shows a diagram of the dependence on the current of the margin of commutating.

The curve marked a in FIG. 4 shows how, for instance the commutating margin $\gamma$ increases only slightly with a decreasing current I, but at currents below $I_{min}$ it increases considerably. The curve b shows the corresponding variation of the direct voltage of the inverter, and thus of the line voltage U. By means of this measure, a lower voltage is secured at a low load current, so the maximum voltage value $U_{krit}$ at 11 in FIG. 1 can be chosen rather low, that is, only slightly above the rated voltage of the transmission. This will prevent an unnecessary delay of the signal from 14, and therefore unnecessarily high overvoltages on the line.

I claim:

1. High-voltage direct current transmission comprising a rectifier station and an inverter station (1 and 2, respectively), each connected to an AC network (3 and 4, respectively) and connected together by a DC line (5), in which in order to limit overvoltages on the line and in the rectifier station upon starting of the station towards an open line, the rectifier station is provided with means for sensing the voltage and current of the station (7 and 8, respectively), a signal emitter, level indicators (9 and 10, respectively) for maximum voltage and minimum current connecting the sensing means to the signal emitter (13), the signal emitter including means responsive to the combination of a direct voltage above a certain level and a direct current below a certain level, and means responsive to a signal from the signal emitter to reduce the direct voltage of the station.

2. Transmission according to claim 1, in which between said means for sensing the voltage and the current (7 and 8, respectively) and said level indicators (9 and 10, respectively) there are means (15–20) for compensating the line reactance between the rectifier and inverter stations (1 and 2, respectively).

3. Transmission according to claim 1, in which the inverter station (2) is provided with a means for controlling the commutating margin (22), and in which in order to be able to limit the level of the voltage level indicator (9) to a reasonably low value, said margin controlling means being current-dependent in such a way that the margin of commutating increases at a low direct current, whereby the direct voltage (U) of the inverter station is decreased.

* * * * *